United States Patent
Liu et al.

(10) Patent No.: US 9,444,090 B2
(45) Date of Patent: Sep. 13, 2016

(54) LITHIUM METAL DOPED ELECTRODES FOR LITHIUM-ION RECHARGEABLE CHEMISTRY

(71) Applicant: THE REGENTS OF THE UNIVERSITY OF CALIFORNIA, Oakland, CA (US)

(72) Inventors: Gao Liu, Piedmont, CA (US); Vince Battaglia, San Anselmo, CA (US); Lei Wang, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 156 days.

(21) Appl. No.: 14/347,957

(22) PCT Filed: Oct. 5, 2012

(86) PCT No.: PCT/US2012/059127
§ 371 (c)(1),
(2) Date: Mar. 27, 2014

(87) PCT Pub. No.: WO2013/052916
PCT Pub. Date: Apr. 11, 2013

(65) Prior Publication Data
US 2014/0227432 A1    Aug. 14, 2014

Related U.S. Application Data

(60) Provisional application No. 61/700,790, filed on Sep. 13, 2012, provisional application No. 61/543,629, filed on Oct. 5, 2011.

(51) Int. Cl.
| | |
|---|---|
| *C08K 3/04* | (2006.01) |
| *H01M 4/04* | (2006.01) |
| *H01M 4/133* | (2010.01) |
| *H01M 4/1393* | (2010.01) |
| *H01M 4/587* | (2010.01) |
| *H01M 4/62* | (2006.01) |
| *H01M 10/0525* | (2010.01) |
| *H01M 4/36* | (2006.01) |

(52) U.S. Cl.
CPC ......... *H01M 4/0404* (2013.01); *H01M 4/0416* (2013.01); *H01M 4/133* (2013.01); *H01M 4/1393* (2013.01); *H01M 4/366* (2013.01); *H01M 4/587* (2013.01); *H01M 4/622* (2013.01); *H01M 4/623* (2013.01); *H01M 4/625* (2013.01); *H01M 10/0525* (2013.01); *Y02E 60/122* (2013.01)

(58) Field of Classification Search
CPC . H01M 4/0404; H01M 4/366; H01M 4/0416
USPC ....................................... 524/495
See application file for complete search history.

(56) References Cited

U.S. PATENT DOCUMENTS

| | | | |
|---|---|---|---|
| 2008/0274408 A1* | 11/2008 | Jarvis ................ | H01M 4/133 429/231.95 |
| 2009/0123850 A1* | 5/2009 | Takeuchi ........... | H01M 4/0433 429/342 |
| 2010/0129719 A1 | 5/2010 | Ito et al. | |

FOREIGN PATENT DOCUMENTS

| | | | | |
|---|---|---|---|---|
| CN | 101640264 | * | 2/2010 | ............ H01M 4/04 |
| CN | 101740807 A | | 6/2010 | |

OTHER PUBLICATIONS

Translation of CN101640264, Feb. 3, 2010.*
International Search Report and Written Opinion for PCT Application No. PCT/US2012/059127, filed Oct. 5, 2012, 11 pages.
Search Report for Chinese Application No. 201280054709.9, filed Oct. 5, 2012, 2 pages.

* cited by examiner

*Primary Examiner* — Hui Chin
(74) *Attorney, Agent, or Firm* — Lowenstein Sandler LLP

(57) ABSTRACT

An embodiment of the invention combines the superior performance of a polyvinylidene difluoride (PVDF) or polyethyleneoxide (POE) binder, the strong binding force of a styrene-butadiene (SBR) binder, and a source of lithium ions in the form of solid lithium metal powder (SLMP) to form an electrode system that has improved performance as compared to PVDF/SBR binder based electrodes. This invention will provide a new way to achieve improved results at a much reduced cost.

18 Claims, 19 Drawing Sheets

1. SBR is dissolved in toluene to form a viscous solution

2. Mix acetylene black (AB) into the SBR/toluene solution

3. Mix active materials (surface coated or non-coated) in the AB/SBR/toluene slurry 4. Slit coat graphite anode electrode and dry

LITHIUM METAL DOPED ELECTRODES FOR LITHIUM-ION RECHARGEABLE CHEMISTRY

CROSS REFERENCE TO RELATED APPLICATIONS

This application is a US National Stage 371 Application of PCT application No.: PCT/US2012/059127, filed Oct. 5, 2012, which claims priority to U.S. Provisional Application Ser. No. 61/700,790 filed Sep. 13, 2012 and to U.S. Provisional Application Ser. No. 61/543,629 filed Oct. 5, 2011, which are hereby incorporated by reference in their entirety.

STATEMENT OF GOVERNMENTAL SUPPORT

The invention described and claimed herein was made in part utilizing funds supplied by the U.S. Department of Energy under Contract No. DE-AC02-05CH11231 between the U.S. Department of Energy and the Regents of the University of California for the management and operation of the Lawrence Berkeley National Laboratory. The government has certain rights in this invention.

BACKGROUND OF THE INVENTION

1. Field of the Invention

The present invention relates to the field of lithium ion batteries. This invention also relates generally to improved electrodes for lithium ion batteries and methods for making same.

2. Related Art

Due to the exponential growth in global energy consumption, rapid depletion of fossil fuels, concomitant growth in greenhouse gas emissions, and the upward spike in the prices of crude-oil and gasoline, significant concerns and efforts have been focused on the development of clean and renewable energy sources and advanced energy storage technologies. Lithium-ion batteries are the most popular rechargeable energy storage devices in consumer electronics and main contenders for powering commercially viable electric vehicles in the near future.

Further development of high-performance rechargeable lithium-ion batteries (LIBs) is indispensable for the ever growing needs for electric vehicles (EV), hybrid electric vehicles (HEV) and plug-in hybrid electric vehicles (PHEV). Remarkable research efforts have been devoted to improving the already incomparable performance of rechargeable LIBs which are ubiquitous in various fields since its successful commercialization about 20 years before. The most popular graphite-based anodes, with a theoretical specific capacity of 372 mAh/g, are commonly used in commercially available rechargeable LIBs along with several types of Li oxide based cathodes (less than 170 mAh/g specific capacity). However, current graphite and transition metal oxide based electrodes only provide moderate energy-storage capability and therefore it is difficult for them to meet the increasing demands for advanced energy storage. Hence, it is essential to design and synthesize new anode materials that can offer the promise of high-performance LIBs with elevated efficiency, superior storage capacity and gravimetric energy density, longer cycle life, easier state-of-charge control, lower cost, and safer operation.

Silicon-based electrodes for rechargeable LIBs have attracted considerable attention because they are able to vastly improve the specific capacity of batteries. As a naturally abundant element, silicon has the highest theoretical specific capacity among all exiting materials, which can reach 4200 mAh g$^{-1}$ in the form of Li$_{4.4}$Si. Furthermore, Si is also inexpensive, easy to handle, and has low discharge potential when used as an anode for rechargeable LIBs. These unique attributes endow Si as one of the most promising candidates to replace graphite as the anode for high performance rechargeable LIBs.

Unfortunately, silicon's potential in broad commercial applications has been hindered by severe capacity fading and loss of electrical contact caused by large volume change, structural crumbling, and even cracking during repeated charge and discharge cycling, especially at high current rates. Downsizing from conventional bulk silicon to various nanoscale morphologies and structures or dispersing these nanostructured Si into carbon matrices are among the most appealing approaches being pursued to overcome these issues and to improve the overall electrochemical performance of Si-based anodes in rechargeable LIBs.

For example, studies on electrodes made of Si bulk films and particles of the order of microns revealed severe capacity fade and short cycle life due to structural crumbling and/or cracking. On the other hand, electrodes made of Si thin-films, nano-wires, and nano-particles showed a marked improvement in the fracture performance. Clearly, the surface area per unit mass increases in inverse proportion to the particle size. Although decreasing the particle size improves the rate of lithiation/delithiation and fracture resistance, it also offers large surface area for electrolyte-reduction reactions resulting in the formation of solid-electrolyte-interphase (SEI) layer and the associated irreversible loss of Li. It has been shown that capacity loss to SEI formation on graphite electrodes was proportional to the surface area of the electrode; assuming the formation of a Li$_2$CO$_3$ film, a SEI thickness of 4.5 nm on carbon particles was calculated, consistent with the barrier thickness needed to prevent electron tunneling.

The SEI layer plays an important role in the safety, power capability, and cyclic life of Li-ion batteries. In one of the earliest works on the SEI, a model was proposed for a SEI formation mechanism in non-aqueous electrochemical systems such as Li-ion batteries that concluded that formation of a chemically and mechanically stable SEI layer is the key for improving the cycle life of batteries. For example, Chen et al. enhanced the electrochemical performance of Si electrodes by improving the properties of SEI layer (achieved by adding vinylene carbonate additive in their electrolyte).

Recently, it was shown that additives such as propylene carbonate, lithium difluoro-oxalatoborate, and fluoro-ethylene carbonate dramatically improve the cyclic efficiency of Si electrodes. Lee et al. found that SEI layer on Si electrode forms due to reduction of organic solvents and anions at the electrode surface during charging and discharging cycles of batteries; bulk of the formation occurs during the first cycle. Yu-Chan et al. characterized SEI layers formed on Si electrodes and found fluorinated C and Si species, besides the usual Li$_2$CO$_3$, alkyl Li carbonates (ROCO$_2$Li), LiF, ROLi, and polyethylene oxides that are found on graphite electrodes. SEI formation on the negative electrode is an irreversible reaction that consumes cyclable Li-ions from the positive electrode leading to most of the capacity loss observed in the first lithiation/delithiation cycle of secondary lithium-ion batteries.

Besides capacity loss in the first cycle, continuous formation of this layer also increases resistance to Li-ion diffusion (i.e., internal impedance of a battery). In spite of the important role played by the SEI layer on the calendar and cycle life of secondary lithium-ion batteries made with Si anodes, there have not been many studies on understanding the mechanisms of initial formation of SEI on Si electrodes. Furthermore, there have been few attempts towards quantifying the first-cycle capacity loss due to SEI-layer formation on Si. Since the requirements for fracture tolerance (i.e., small particle size) would be in conflict with the need to minimize the first cycle irreversible loss (i.e., minimize the surface area per unit mass), measurement of Li loss per unit area due to irreversible reactions can serve as a useful design parameter in arriving at optimal micro/nano architectures for Si-based electrodes. Furthermore, quantifying the charge lost to SEI formation is essential for accurately arriving at the true state-of-charge of the silicon electrode during its initial lithiation. For in situ measurements of stress as well as the mechanical properties of a silicon electrode during its initial lithiation, it is essential to know the exact Li concentration in Si electrode to calculate its volumetric strain.

Graphene, a new class of two-dimensional, "aromatic," monolayer of carbon atoms densely packed in a honeycomb crystal lattice, has attracted unmatched attention and has also triggered tremendous experimental activities for applications in next generation electronic and energy storage devices, owing to its exceptional properties including extraordinarily high electronic mobility, outstanding optical transparency, unique electronic structures, intriguing thermal conductivity, and amazing mechanical strength as well as ultrahigh surface area. Hence, graphene could be superior to other carbon materials as a conductive matrix to enhance electron transport and electrical contact with Si active materials in rechargeable LIBs and to effectively prevent the volume expansion/shrinkage and aggregation of Si phases during the Li charge/discharge processes. Furthermore, its large surface area can also facilitate the absorption of Li atoms on both sides of the graphene sheet or into its ubiquitous cavities. As a result, the merits of both carbon and Si phases can be extended to the largest extent based on their synergetic effects.

Recently, Chou et al. (S.-L. Chou, J.-Z. Wang, M. Choucair, H.-K. Liu, J. A. Stride, S.-X. Dou, *Electrochemistry Communications* 2010, 12, 303) blended commercially available nanosized Si particles and graphene to prepare eco-friendly and low cost LIB anodes, which exhibited enhanced cycling stability. In the meantime, several other groups also successfully prepared Si nanoparticles/graphene paper composite as anodes for rechargeable LIBs with high Li storage capability and cycling stability. (See J. K. Lee, K. B. Smith, C. M. Hayner, H. H. Kung, *Chemical Communications* 2010, 46, 2025: G. Wang, B. Wang, X. Wang, J. Park, S. Dou, H. Ahn, K. Kim, *Journal of Materials Chemistry* 2009, 19, 8378) The studies also indicated that graphene can be used to anchor electrochemically active transition metal oxides or metal nanoparticles as anode materials for rechargeable LIBs, and these batteries exhibit enhanced cycle life and improved reversible capacity. See, for example, US Published Patent Application 2011/0033746, filed Aug. 10, 2009. The use of Si nanoparticles, however, may not provide a simple way to optimize the ion transport in the anode, especially when the loading of Si is high. Furthermore, required is the use of inactive binders to hold the Si and Carbon components together, which serves to reduce the overall energy capacity.

Polyvinylidene difluoride (PVDF) has been the widely used binder materials for both cathode and anode electrode. Water soluble styrene-butadiene rubber (SBR) binder has also been tested for LiFePO4, LiCoO2 and Graphite electrodes. Other binders have also been tested. Other potential commercial binders in lithium ion battery electrodes other than PVDF are SBR type of binders for graphite anode application. However, the reported performance based on non-PVDF binders is lower than the performance for PVDF binder electrodes.

BRIEF DESCRIPTION OF THE DRAWINGS

The foregoing aspects and others will be readily appreciated by the skilled artisan from the following description of illustrative embodiments when read in conjunction with the accompanying drawings.

FIG. 13 illustrates an electrode slurry mixing process according to an embodiment of the invention.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Polyvinylidene difluoride (PVDF) has been the widely used binder material for both cathode and anode electrodes. However, the cost of PVDF binder is significantly higher than a styrene-butadiene rubber (SBR) polymer binder. PVDF and SBR binders bind to active material particles such as graphite in cathode and anode electrodes.

Figure 1:
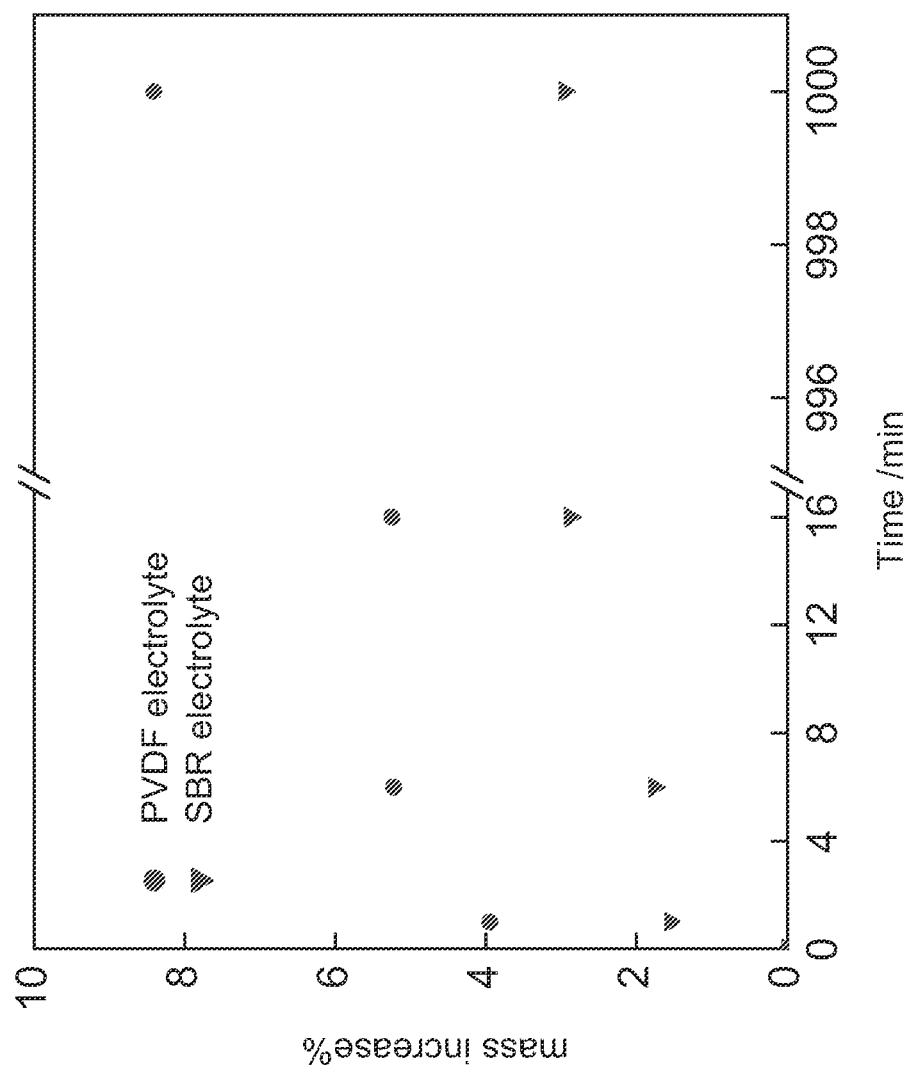
FIG. 1 illustrates a swelling test of polyvinylidene difluoride (PVDF) and styrene-butadiene (SBR) in the 1 M $LiPF_6$ in EC/DEC (1:1 by weight) electrolyte according to an embodiment of the invention.

The PVDF binding force is much lower than that of the SBR binder to the lithium ion electrode materials and to current collectors. In addition, the swelling of PVDF in an electrolyte solution further compromises the PVDF binding force to the active materials. The SBR swells less than the PVDF in electrolyte solutions as illustrated in FIG. 1.

Figure 2:
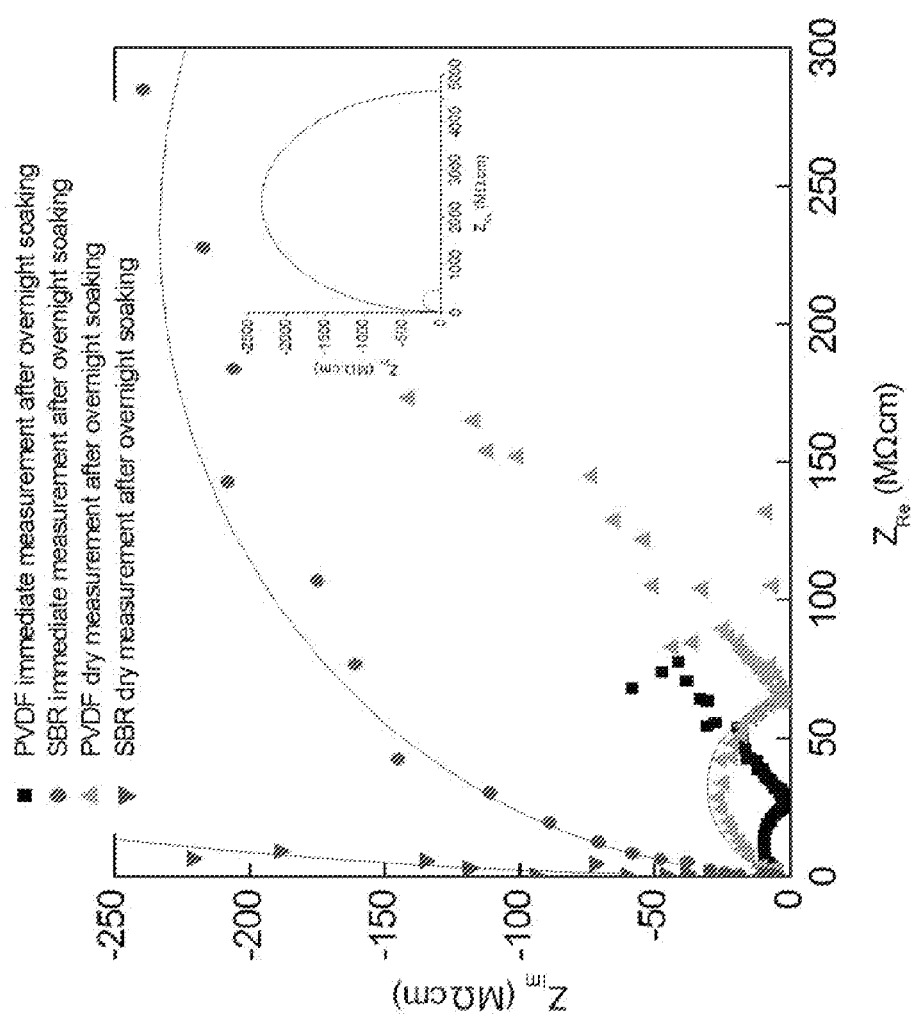
FIG. 2 illustrates impedance of the swelled PVDF and SBR films after exposing to the electrolyte. according to an embodiment of the invention.

However, the swelling of the binder due to an electrolyte is an important factor for the lithium ion transport from the electrolyte to the active material particles. As such, the low swelling SBR has a high impedance while the swelled PVDF has a low impedance as evidenced in FIG. 2.

Embodiments of the invention fully or partially replace PVDF with an SBR binder in the electrode laminates and at the same time retains and/or improves the performance characteristics of the SBR binder electrode in terms of rate, cycle, and storage life.

PVDF has been the widely used binder materials for both cathode and anode electrodes. A water soluble SBR binder has also been tested for $LiFePO_4$, $LiCoO_2$ and Graphite electrodes. Various other binders have also been tested. The only major commercial binder used in lithium ion battery electrodes other than PVDF is the SBR type of binder for graphite anode applications. However, the reported performance based on non-PVDF binders is lower than the performance for the PVDF binder electrodes. Thus, various embodiments of the invention describe the benefits of using a PVDF/SBR hybrid binder electrode system.

The commercially used SBR is a SBR aqueous suspension. SBR solid 50-100 nm round particles are suspended in a water solution. The SBR water suspension is made by an emulsion polymerization process. Surfactant molecules cover the surface of SBR particles. The surfactant produces the suspension properties of SBR nanometer (nm) sized balls in the water solution. The SBR nm particles provide the adhesion between the solid lithium-ion storage and conductive additive particles. However, it has been reported that increasing the amount of SBR binder degrades the performance of the graphite electrode based on the SBR binder.

Figure 3:
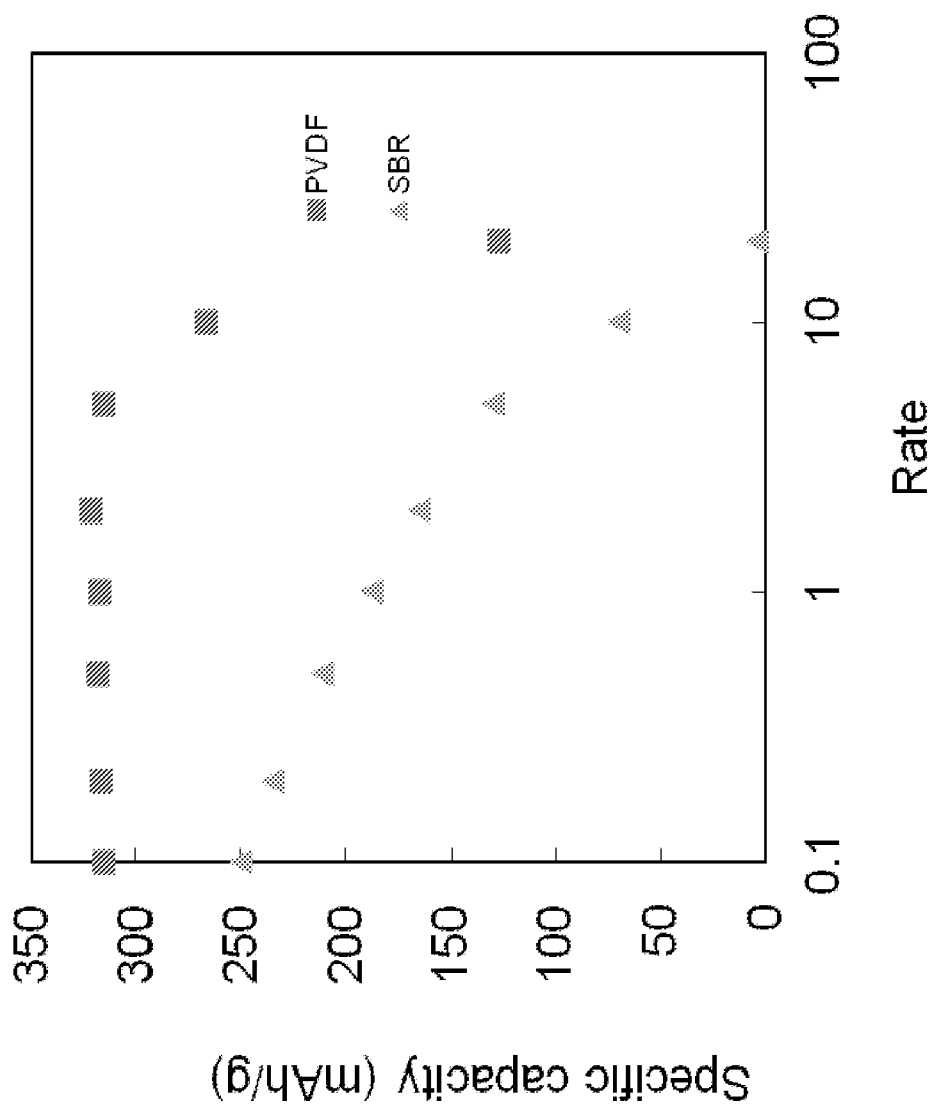
FIG. 3 illustrates the rate performance of electrode made with PVDF binder and SBR binder according to an embodiment of the invention.
Figure 4:
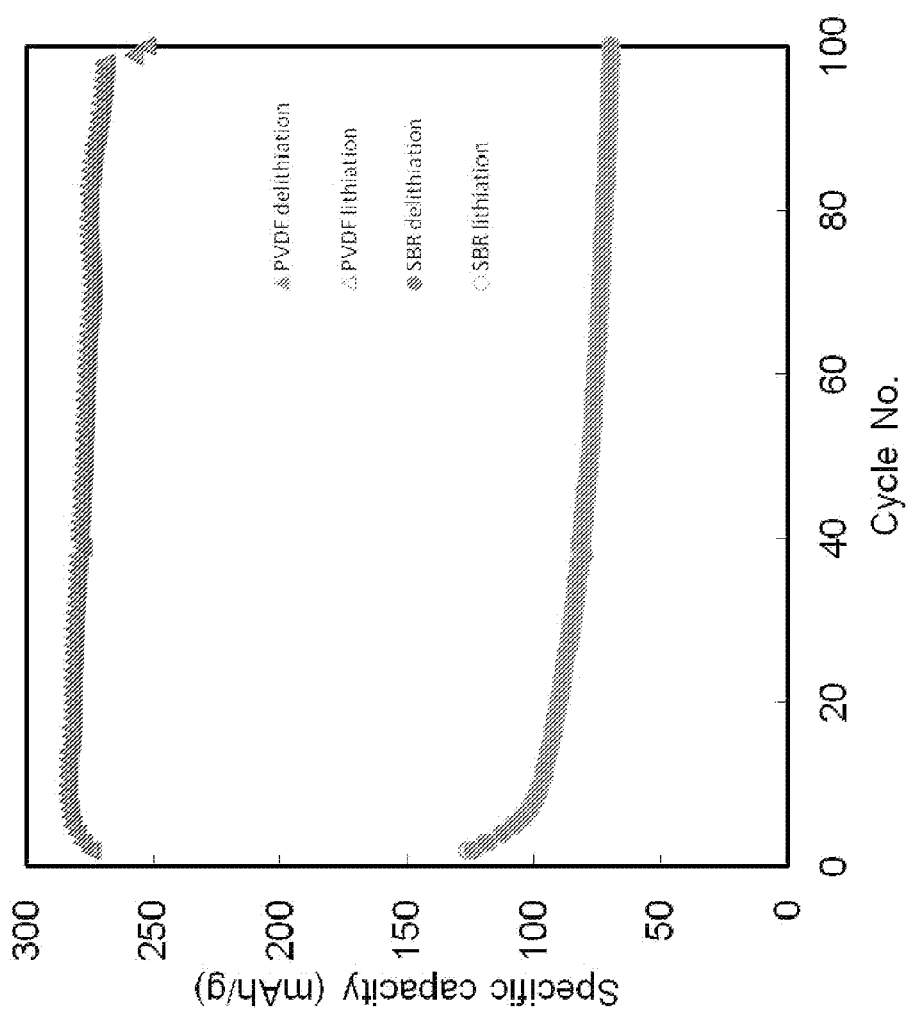
FIG. 4 illustrates the cycling performance of electrode made with PVDF binder and SBR binder according to an embodiment of the invention.
Figure 5:
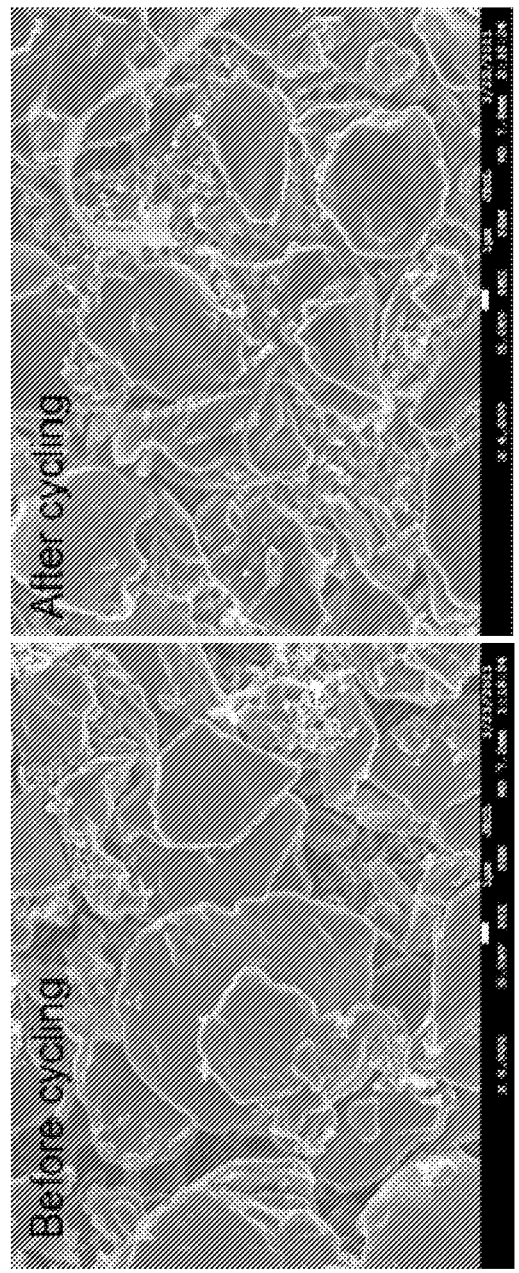
FIG. 5 illustrates SEM images of the SBR binder electrodes before and after cycling tests according to an embodiment of the invention.

An embodiment of the invention demonstrates that when SBR is dissolved in a toluene organic solvent, and the SBR/toluene solution is used to make graphite and acetylene black additive electrodes, the rate and cycling performance of the SBR based electrode is less than hoped for (see FIG. 3, 4). Also, SBR delamination was detected after the cell was cycled (see FIG. 5).

Based on literature reported data on the sensitivity of the amount of SBR used in a aqueous system, the less than hoped for results of SBR/toluene system, and the none swelling properties of the SBR binder as compared to PVDF binder, we concluded that the SBR binders block the lithium-ion movement from the electrolyte to the active material surfaces (in the case of graphite). We further propose the SBR blocking effect to lithium-ion movement will happen when SBR is used as a cathode binder. This Li-ion blocking effect is a major drawback for the use of SBR only as binder.

On the other hand, there are several major attainable benefits from using SBR/low boiling point organic solvent (for example toluene, cyclohexane) solution to make slurry for lithium-ion electrode applications.

First, SBR is made in commodity scale at very low cost as compared to PVDF. Second, slurry made with low boiling point organic solvents can significantly decrease the energy used and shorten the time to dry the laminate. Third, lithium is stable in hydrocarbon solvents such as toluene, allowing for the inclusion of a stabilized lithium metal powder (SLMP) into the slurry mixing, coating and drying process. Thus, improvement is obtained because 1) this SLMP added electrode can reduce irreversible lithium loss during the formation; 2) allows for lithium ion battery formation without application of an external charge; 3) if a large amount of SLMP is added to the anode, it will prelithiate the anode to enable the use of none lithium containing low cost cathodes, such as CFx and $MnO_2$ (electrolytic manganese dioxide) in rechargeable cells.

Various embodiments of this invention contemplate the use of SBR binder for both cathode and anode lithium ion electrodes. In one embodiment, graphite material is utilized as for the anode.

Lithium-ion battery electrode binders other than PVDF have not been widely accepted due to the reduced performance. Both rate and lifetime have been compromised compared to the electrodes made with PVDF based binder. However, the binding force of PVDF is not as strong as many of the other binders such as SBR. Various embodiments of the invention combine both the superior performance of the PVDF binder and the strong binding force of the SBR binder to form an electrode system that has increased or at least equivalent performance compared to the PVDF binder based electrode. In one embodiment, the improved SBR/PVDF based electrode will use far less PVDF binder relative to the PVDF only electrode to reduce the cost of the PVDF materials. Thus, various embodiments of the invention provide a new way to achieve comparable or improved results at a reduced cost.

Various embodiments use the combination of graphite and negative electrode laminate as an example to describe the approach. The approach can be applied to cathode materials and cathode laminates as well.

Figure 6:
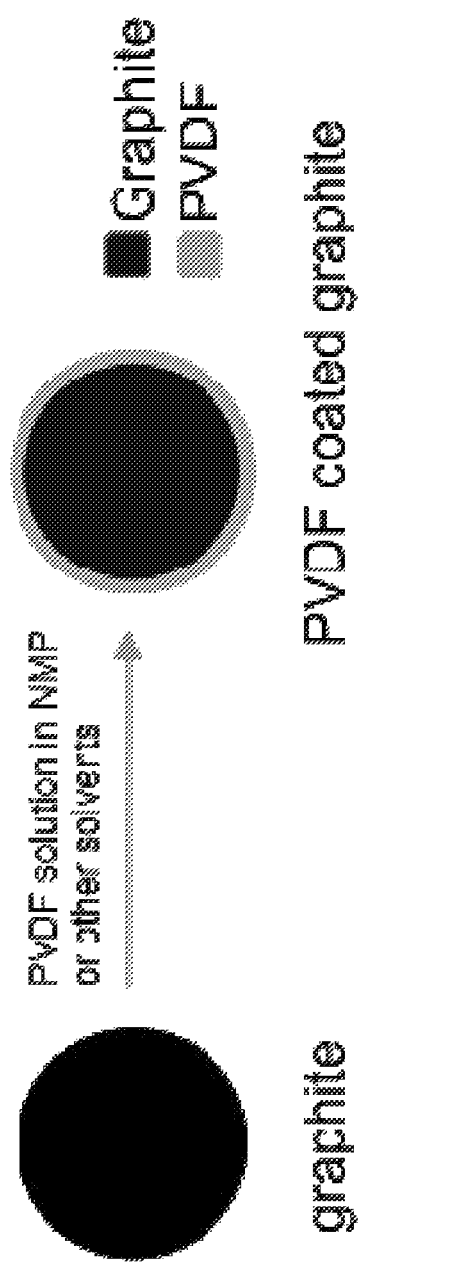
FIG. 6 illustrates a graphite particle coated with PVDF polymer layer by a solution based process according to an embodiment of the invention.

A thin layer of PVDF polymer is coated on the surface of graphite particles as shown in FIG. 6. For example, PVDF is dissolved in N-methylpyrrolidone (NMP) solvent to form a PVDF/NMP solution. A certain amount of graphite particles is added to the solution and mixed thoroughly. The NMP will be evaporated to leave PVDF coated graphite particles. The PVDF coated graphite particle ranges from 10-0.0001% by weight to the graphite. The current result shows that from 0.75-3% of PVDF coating. A 1% PVDF coating by weight gives the best performance data.

Figure 7:
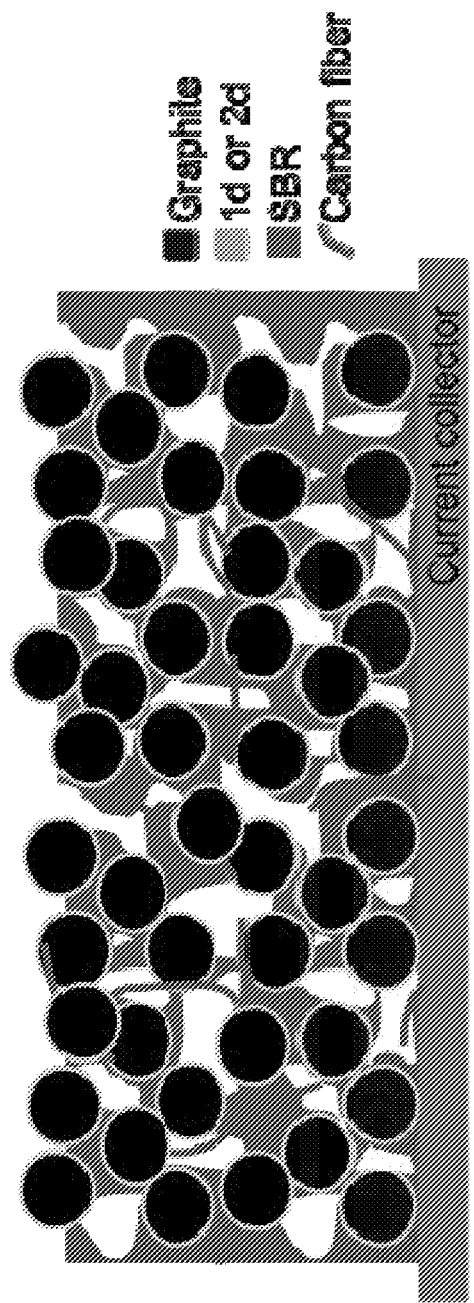
FIG. 7 illustrates a schematic of an electrode cross-section made with PVDF coated graphite particles and SBR binder according to an embodiment of the invention.

Next, the PVDF coated graphite particles are mixed with SBR binder in either a water soluble format or SBR in organic solvent such as toluene to form a slurry. Acetylene black and/or carbon fiber can be part of a conductive additive to add into the slurry. If an organic solvent is used to form slurry, the organic solvent should not dissolve the PVDF coating. For example, a toluene solvent may be used. The slurry may then be utilized to coat an electrode laminate on a Cu current collector, and dried to form a negative electrode as shown in FIG. 7.

The SBR and PVDF do not mix, and PVDF does not dissolve in toluene. During the coating process, the PVDF remains on the surface of the graphite. The SBR is also phase separated from the PVDF in a micro-scale, when the electrode is made. Upon the addition of electrolyte to the electrode assembly, the PVDF will uptake electrolyte and swell. This swelled PVDF layer is in connection with the active material particle surface. The electrolyte swelled PVDF provides a channel for the lithium-ions to move between the electrolyte and active material surface. This invention will overcome the lithium-ion blocking effect exerted by a SBR coating on active material surface in SBR only systems.

Figure 8:
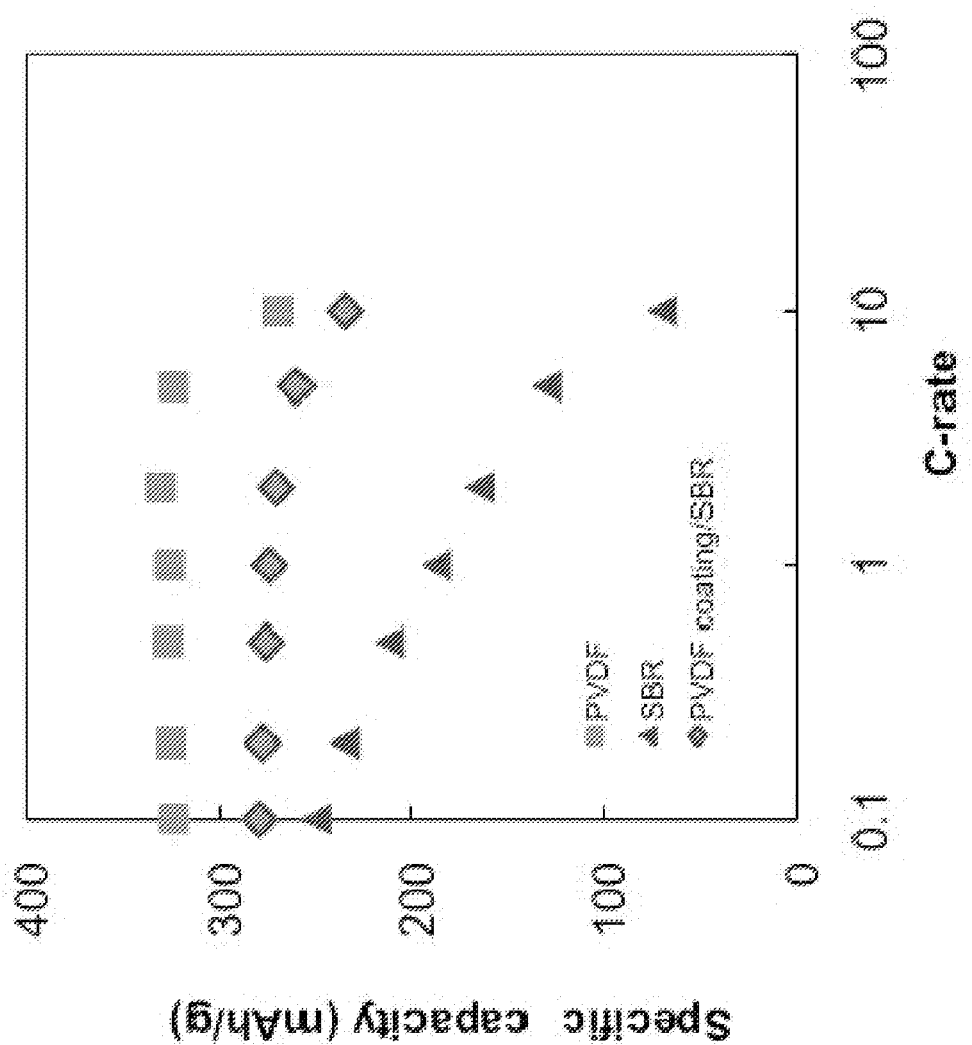
FIG. 8 illustrates rate performance of graphite electrode with different binders. PVDF coating is 2% of the weight of the graphite of the PVDF costing/SBR series (diamond) according to an embodiment of the invention.
Figure 9:
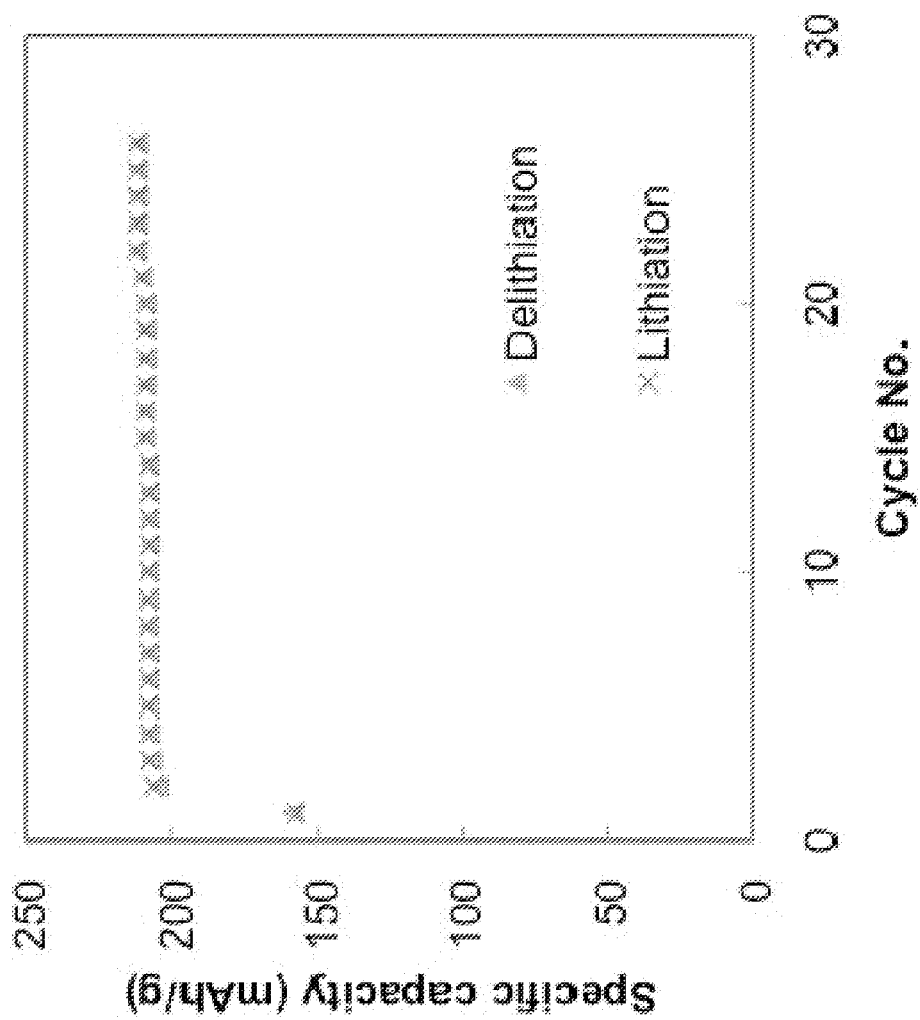
FIG. 9 illustrates cycling performance of PVDF coating graphite with SBR binder according to an embodiment of the invention.

The performance of PVDF coated graphite particles using SBR binder materials has shown much improved performance compare to the SBR binder alone system. FIG. 8 shows the rate performance comparison among the three electrode compositions: 1) PVDF binder (orange square), 2) SBR binder (blue triangle) and 3) PVDF coating/SBR binder (diamond). The rate performance of 2% PVDF coated graphite performs as good as a PVDF binder based electrode, and far superior than the SBR binder without PVDF coating. The electrode made with PVDF coating graphite and SBR binder shows very good cycling performance as illustrated in FIG. 9.

Possible surface modification agents for an anode include PVDF and related copolymer, polyether (such as polyethyleneoxide (PEO)) type of materials, polyvinylenecarbonate and its derivatives. Possible surface modification agents for cathode include PVDF, polyvinylenecarbonate, and its derivatives.

Figure 10:
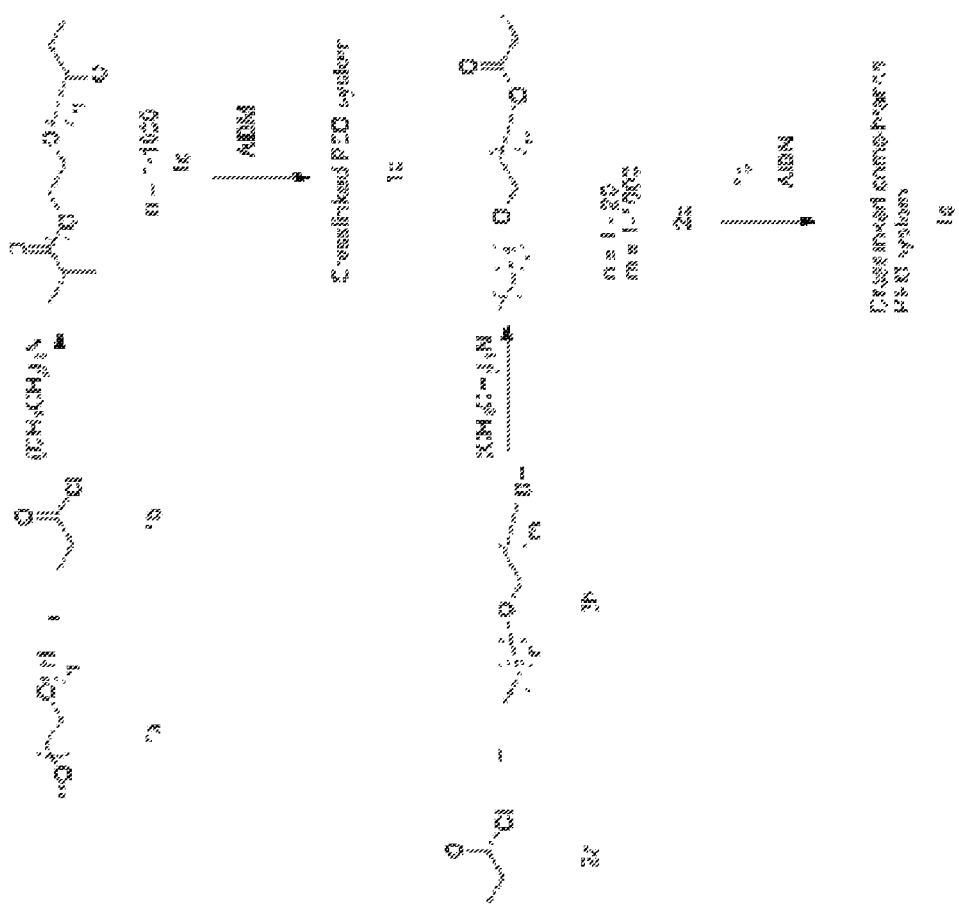
FIG. 10 illustrates polyethyleneoxide (PEO) derivatives used for active material particle coating according to an embodiment of the invention.
Figure 11:
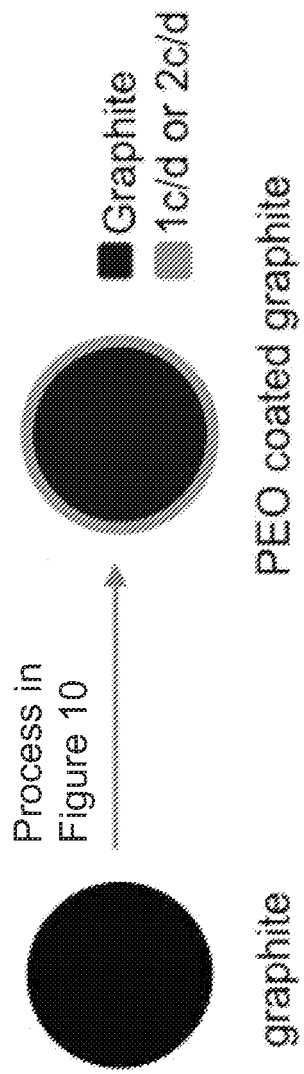
FIG. 11 illustrates a graphite particle with coated cross-linked PEO polymer layer by the cross-linking process in FIG. 10 according to an embodiment of the invention.

FIG. 10 shows the molecular structures of the PEO derivatives according to embodiments of the invention. A thin layer of PEO type of polymer precursors (1c or 2c) is coated on the surface of graphite particles as shown in FIG. 11. An example of the process is as follows. The 1c polymer precursor (FIG. 10) and a small amount of radical initiator (e.g. Azobisisobutyronitrile, (AIBN)) are dissolved in ether solvent to form a solution. A certain amount of graphite particles are added to the solution and mixed thoroughly. The ether will be evaporated to leave 1c polymer precursor coated graphite particles. The 1c polymer precursor is in a range from 10-0.0001% by weight of the graphite. The 1c polymer precursor/graphite mixture is dispersed in a solvent, which does not dissolve the 1c polymer precursor, (eg. Hexane). Heating or UV light will be used to initiate the crosslinking of the 1c polymer precursor to form a permanent coating (1d) on the surface of the graphite, while the coated graphite particles are dispersed in the solvent.

Figure 12:
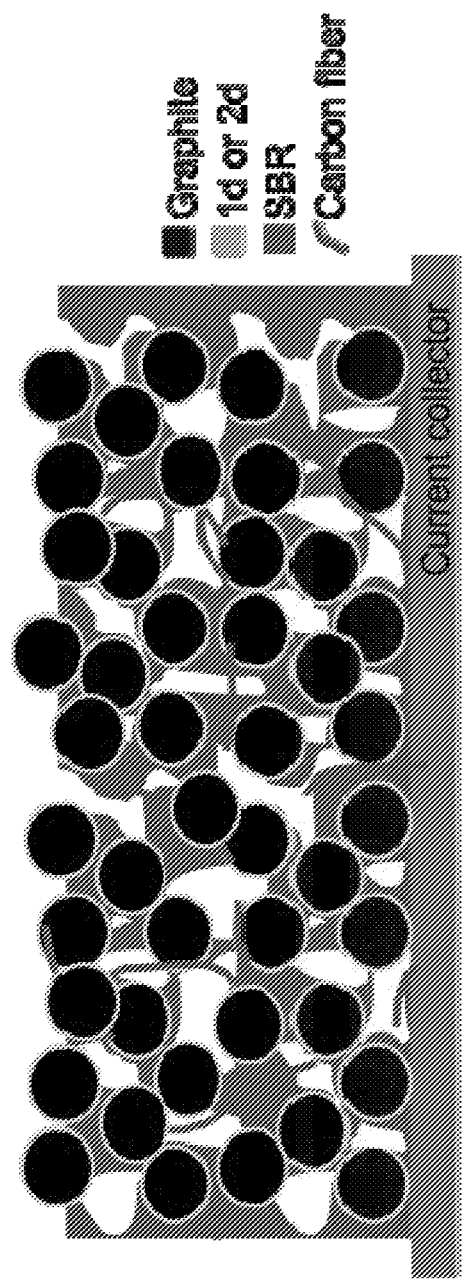
FIG. 12 illustrates a schematic of an electrode cross-section made with PEO coated graphite particles and SBR binder according to an embodiment of the invention.

This 1d coated graphite particles will be mixed with SBR binder in aqueous based SBR dispersion or SBR in organic solvent such as toluene to form slurry. Acetylene black or/and carbon fiber can be part of the conductive additive to add into the slurry. The solvents used in this step should not dissolve the 1c coating, as it is already crosslinked. This slurry is used to coat an electrode laminate on a Cu current collector, and dried to form the negative electrode as FIG. 12.

Introduction of Sold Lithium Metal Powder (SLMP) to Improve Lithium Ion Battery Performance Improvement of the performance of lithium ion battery systems depends on the development of new advanced electrode materials and electrolytes, and the precise control of the complex side-processes that take place at the electrode/electrolyte interfaces. A thin surface layer (a few tens of nanometers) referred to as solid electrolyte interphase (SEI) that forms on electrode surfaces determines cell electrochemical behavior, cell lifetime, and safety performance. The key function of the SEI is to allow the cell operation under thermodynamically unfavorable conditions. Nonetheless, full understanding of the mechanism of SEI formation, its composition, and exact function remains one of the greatest challenges in lithium-ion battery fundamental research.

Current lithium ion rechargeable chemistry has limited energy density, high cost, and multiple causes of capacity fade. Lithium ion batteries all require a SEI formation process which is both time consuming and resource intensive. It is estimated that approximately 20% of the battery cost comes from the SEI formation process.

The SEI formation process consumes lithium ions within the battery. Thus, this process may result in a 10-20% capacity fade before the battery leaves the factory. In addition, new anode materials incorporating Si may have a higher formation loss of up to 50%.

Lithium metal in different forms including SLMP hold promise to solve these issues, leading to new and improved lithium ion batteries with a less complex formation process, lower cost, and higher energy density.

Embodiments of the invention describe use of lithium metal such as SLMP materials to pre-lithiate cathodes or anodes at a controlled level to manufacture a new battery with a simplified and lower cost formation process, an overall lower cost, and an improved energy density.

Historically, the lithium ion rechargeable battery formation is done with a slow charge, hold and discharge, and repeated charge and discharge over approximately 3-4 weeks in the lithium-ion battery manufacture plant. This is a very time consuming process and takes up a lot of capital, i.e., charging stations (incur instrument cost), large space for storage, and slow capital turn-over rate. The formation process is estimated to account for 20% of the overall battery cost. This formation process also leads to 10-20% of the initial capacity loss. This issue has not been addressable with the current manufacturing process.

Also, because the state of the art graphite anode does not initially contain lithium-ions, the current rechargeable lithium-ion battery must use cathode materials that contain lithium ions at their initial stage. Thus, non-lithium-ion containing cathodes have only been used in the lithium primary batteries (non-rechargeable) with lithium metal negative electrodes.

Various embodiments of the invention describe a new method to utilize lithium metal in the manufacturing process of lithium ion rechargeable batteries. Lithium metal cannot be used easily as a negative electrode in a lithium ion rechargeable battery. A typical charge process plates lithium ions onto lithium metal if lithium metal is used as a negative electrode. This plating process turns a lithium metal flat surface into a rough surface wherein lithium dendrites form. The accumulation of the dendrites causes cell failure and potential for a run-away explosive reaction.

In one embodiment of the invention, the lithium is delivered in metal form in either a laminate or a solid lithium metal powder (SLMP) powder) wherein after a first cycle the lithium metal turns into ions, which intercalate into either positive or negative active materials. The battery is cycled as a regular lithium ion battery. Various embodiments of the invention solve three major issues in the current lithium-ion rechargeable battery system, 1) a lengthy and costly SEI formation process, 2) SEI formation capacity loss, and 3) limited choices for cathode materials.

An embodiment of the invention describes an improvement in the SEI formation process. Lithium ion rechargeable batteries require a lengthy and costly formation process. A graphite negative electrode needs to be brought down to a potential below 0.8 V (Li/Li+) to form a stable SEI surface layer. The negative electrode may need to remain at this potential for extended periods of time (up to 4 weeks) to form a robust SEI coating layer. An embodiment of the invention describes introducing lithium metal into the negative electrode during the manufacturing process. The electrode potential can be controlled by the amount of lithium metal added. The manufactured cell can directly enter into the SEI formation stage without applying an external voltage. This can significantly simplify and improve the SEI formation process and reduce the formation cost.

An embodiment of the invention describes a reduction in the formation capacity loss. Both positive electrode materials and negative electrode materials encounter a capacity loss during the formation process. The capacity loss is due to the consumption of lithium in the cell. The amount of available lithium is limited in a regular lithium ion battery. Introducing lithium in the metal form directly in negative electrode or positive electrode leads to reduction/elimination of the formation capacity loss, resulting in higher cycling capacity.

In current lithium ion batteries, a graphite anode has no lithium in its initial manufactured stage thus requiring the cathode to be in a lithiated format. This limits the choice of cathode materials for manufacturing lithium-ion battery. The introduction of lithium metal in a negative electrode in a higher content leads to partial or full lithiation of negative electrode materials. This will then allow new non-lithiated cathode materials to be used in the rechargeable battery.

Figure 14:
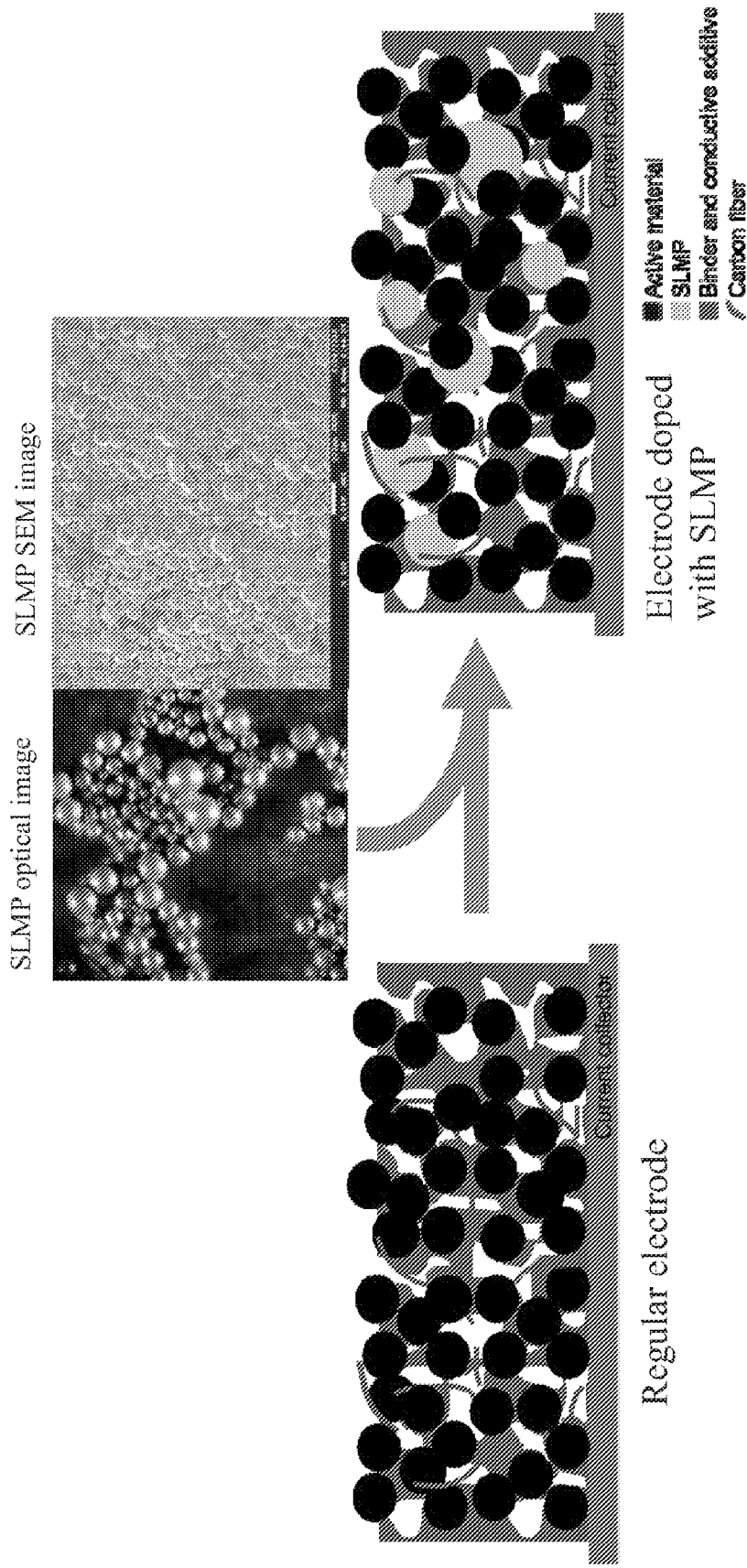
FIG. 14 illustrates a schematic of cross section images of a regular electrode and electrode mixed with SLMP according to an embodiment of the invention.

Lithium metal sheets can be directly laminated on the positive or negative electrode. However, for manufacturing optimization, a SLMP is used. SLMP may be added during the electrode slurry mixing process of FIG. 13. The active material can be graphite, silicon, Sn, or other alloy anode materials, or cathode materials such as LiCoO2, LiMnO2, LiFePO4, MnO2 (EMD), etc. This electrode manufacturing process is similar to the PVDF based electrode-coating process described above. This process directly incorporates SLMP into the final electrode laminate as seen in FIG. 14. This electrode can be a positive (cathode) electrode or a negative (anode) electrode. FIG. 14 illustrates a schematic of cross section images of a regular electrode and electrode mixed with SLMP.

In order to introduce the SLMP into the slurry, both solvent and binder have to be stable towards the SLMP materials. The SBR (polystyrene-co-butadiene rubber)/toluene binder is stable towards SLMP. These combination is used as binder choice to make both cathode and anode electrode. Other combinations of binder and solvent combinations can also be used in this invention if they are stable toward SLMP.

The SBR binder can exert high interfacial impedance on the surface of the active materials (both cathode and anode materials) during electrode operation. As discussed above, a polymer coating can be applied on the active material particles (for either cathode and anode materials).

Figure 15:
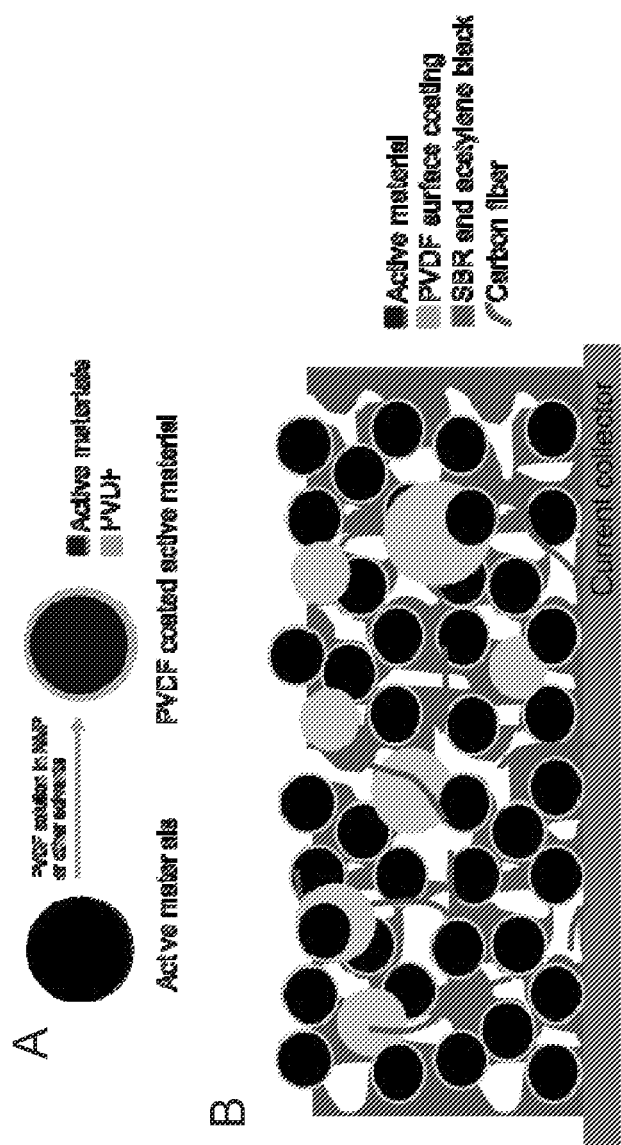
FIG. 15 illustrates a) polyvinylidene fluoride (PVDF) coated active material particles, and b) an electrode made with these particles for fast ion transport with SBR binder and SLMP additive according to an embodiment of the invention.

FIG. 15 illustrates a) polyvinylidene fluoride (PVDF) coated active material particles, and b) an electrode made with these particles for fast ion transport with SBR binder and SLMP additive. The polymer coating can be polyvinylidene fluoride (PVDF) for both cathode and anode particles, polyethyleneoxide (POE) and its derivative for anodes, or other polymers that are 1) stable at the electrode working voltage window and 2) swells in a degree that allows fast lithium ion transport.

The final electrode is a mixture of active material particles, acetylene black (AB) conductive additives, SBR binder, and SLMP in different ratios. The amount of lithium metal (SLMP in the slurry or lithium metal directly on the electrode surface) in the cell can be adjusted to the desired amount among a range from 0.01% to 1000% of the cell capacity, but normally the lithium metal is in a range of 1-150% of the cell capacity.

Figure 16:
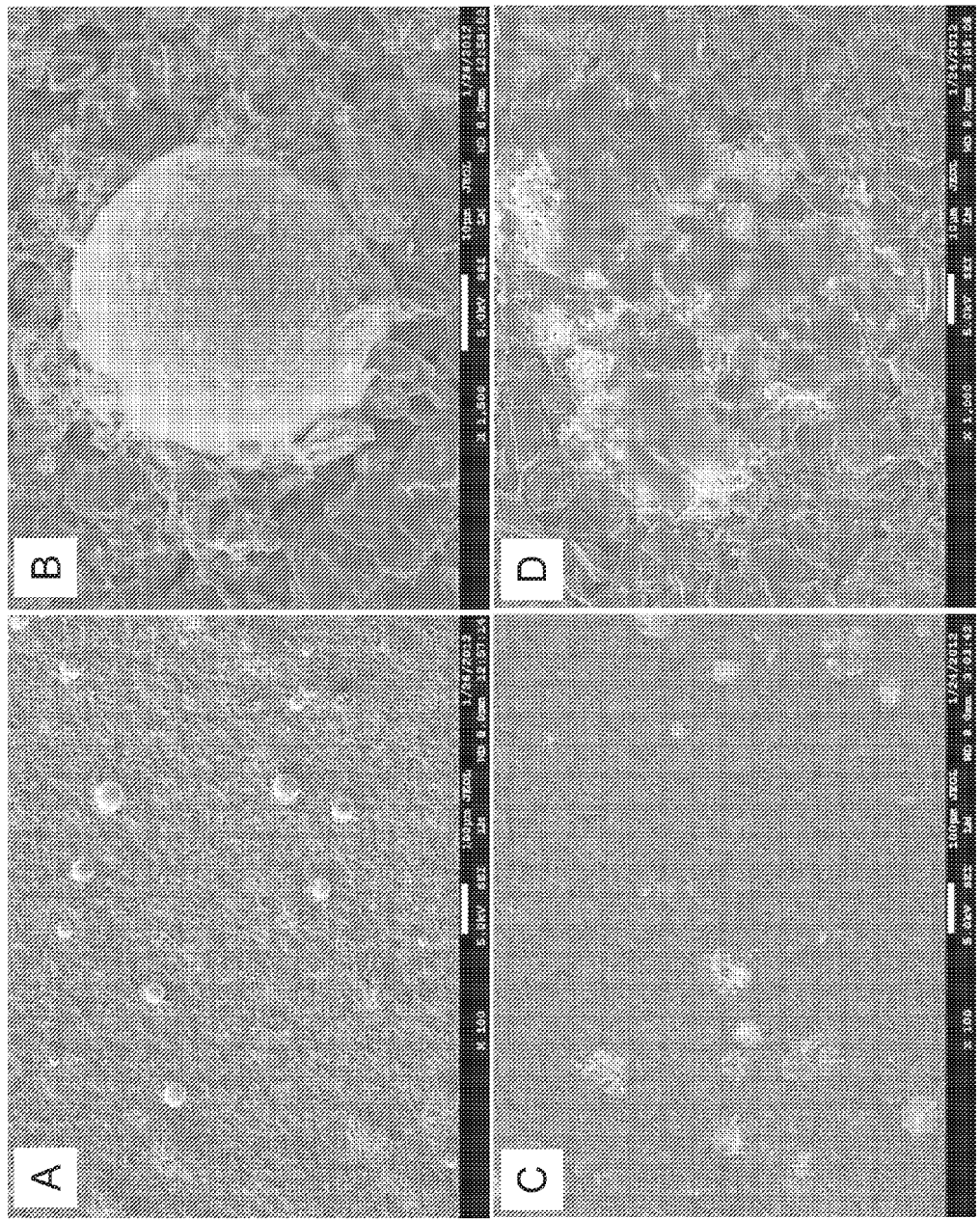
FIG. 16 illustrates a graphite electrode (graphite particles) with SLMP according to an embodiment of the invention.

FIG. 16 illustrates a graphite electrode (graphite particles) with SLMP. SEM images of the surface of graphite electrode doped with SLMP in the laminate are illustrated. FIG. 16 $a,b$ illustrate the as made electrode after drying and before compression. FIG. 16 $c,d$ illustrate after calendaring (compression process to physically break the $Li_2CO_3$ shell). The electrode composition is: 2% SLMP, 88% CGP-G8, 5% SBR, 5% ABA.

The SLMP has a hard insulating $Li_2CO_3$ shell and a soft lithium metal core. The shell needs to be broken to expose lithium metal in order for the lithium metal to participate in the cycling process. The SLMP can be mixed in during the slurry process to make a graphite anode electrode at 2% of SLMP content of the dry laminate weight. The shell protects the SLMP from both reacting with graphite, moisture and oxygen. The electrode may then be then compressed to break the shell to activate the SLMP by exposing the lithium metal core, and smooth out the electrode surface uniform. The SLMP can also mixed in the positive electrode slurry process. The breakdown of the insulating $Li_2CO_3$ is done either by a compression process to physically break the shell, and/or charging the cathode above 4V (Li/Li+) to electrochemically oxidize the carbonate to a soluble lithium ion species. The charging break down of $Li_2CO_3$ is referred to as an electrochemical activation process.

Figure 17:
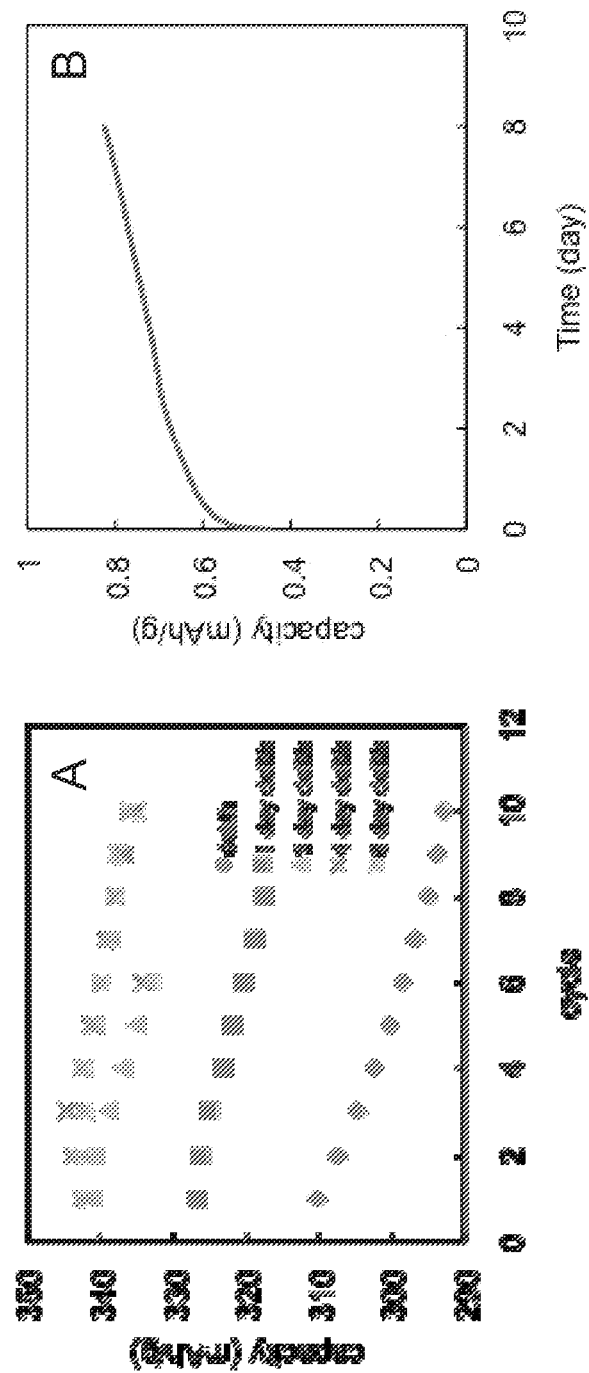
FIG. 17 illustrates a) the initial delithiation performance of electrodes after different resting times, and b) the potential changes during the resting period according to an embodiment of the invention.

When a specified amount of SLMP is added into a negative electrode laminate, a spontaneous SEI formation occurs. SLMP can be added to a graphite negative electrode to adjust the initial electrode potential and facilitate a fast formation process. FIG. 17 illustrates a) the initial delithiation performance of electrodes after different resting times, and b) the potential changes during the resting period. The composition of the anode electrode is 88% CGP-G8 (graphite), 2% SLMP, 5% SBR, 5% AB. The SLMP is added into the CGP-G8 anode slurry. The SLMP accounts for 2% of the total weight of the dried electrode laminate. The electrodes were made into coin cells with lithium metal as counter electrode. The cells were rested at different periods of time from no rest (delith sample) to rest for 8 days before cycling. The anode initial potential is below the formation potential required. During resting, the electrode potential drifts up to 0.8 V (Li/Li$^+$), while the SEI formation occurs. The electrodes rested for 4 and 8 days performed better than that of the electrode with no rest or 1-2 days of rest.

Figure 18:
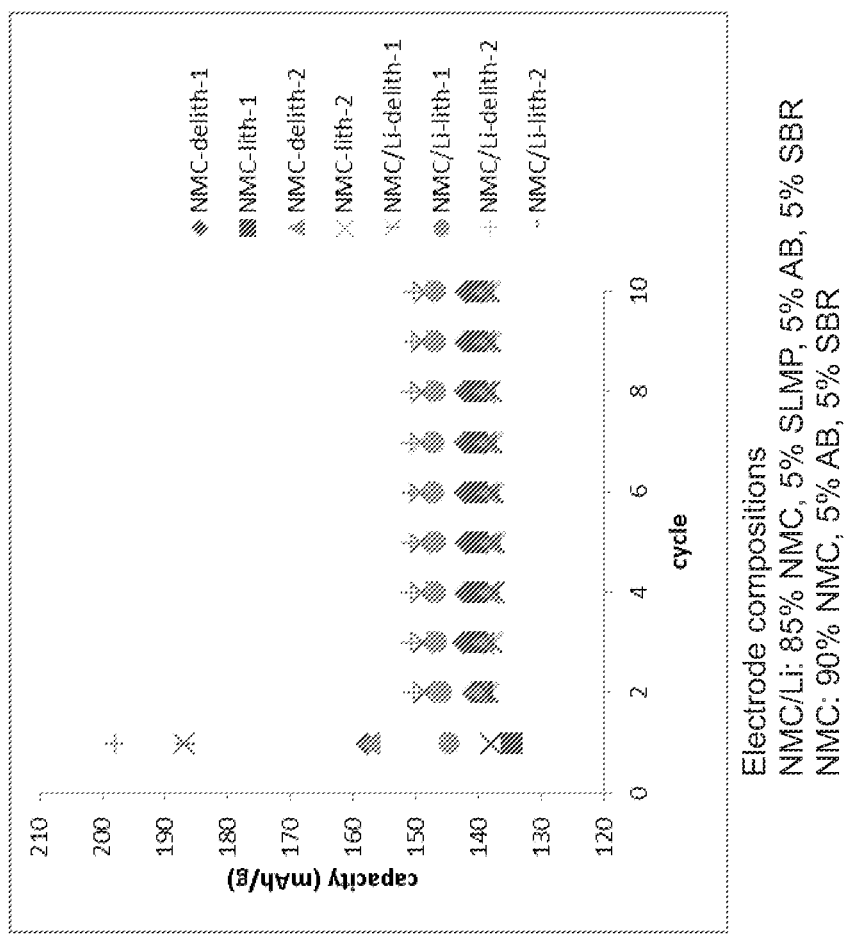
FIG. 18 illustrates the cycling of a regular nickel manganese cobalt (NMC) electrode against a lithium counter electrode, vs. the cycling of SLMP doped NMC electrode against a lithium counter electrode according to an embodiment of the invention.

When a specified amount of SLMP is added into a positive electrode laminate, the SLMP improves the positive electrode performance as shown in FIG. 18. The SLMP is added into the cathode slurry. The SLMP accounts for 5% of the total weight of the dried electrode laminate. A comparison of an electrode of NMC with and without SLMP was made. FIG. 18 illustrates the cycling of a regular nickel manganese cobalt (NMC) electrode against a lithium counter electrode, vs. the cycling of SLMP doped NMC electrode against a lithium counter electrode. The SLMP is mixed in the NMC positive electrode laminate and the electrode was compressed to activate SLMP. The cycling shows improved gravimetric specific capacity of the cathode electrode with the SLMP coating compared to the one without.

Figure 19:
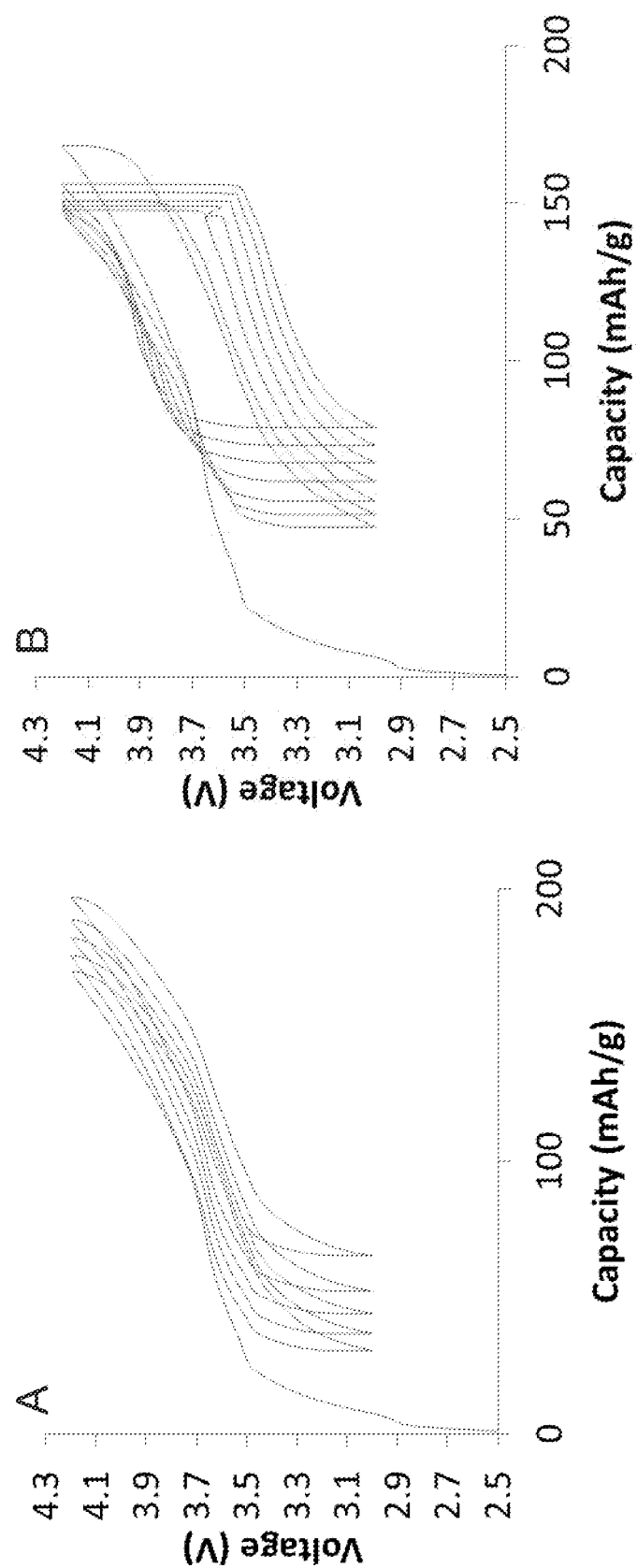
FIG. 19 illustrates the initial cycling performance of nickel manganese cobalt (NMC) cathode—graphite anode cells, a) the cycling of SLMP doped NMC electrode cell, and b) the cycling of a regular NMC electrode cell according to an embodiment of the invention.

The additional lithium in the positive electrode also compensates for the formation loss when a graphite anode is used as shown in FIG. 19. The cathode comprises NMC material. The cathode composition with SLMP is 85% NMC, 5% SLMP, 5% AB, 5% SBR. The base line cathode composition without SLMP is 90% NMC, 5% AB, 5% SBR. The anode comprises standard CGP-G8 graphite materials. Anode composition is same for both cathode comparisons at 82% CGP-G8, 15% PVDF, 3% AB by weight. The anode is 20% over capacity relative to the cathode in the cell. The SLMP doped NMC cathode has a much higher reversible capacity and lower voltage over-potential compared to the regular non-SLMP doped NMC electrode.

What is claimed is:

1. A composition of matter comprising:
a styrene-butadiene rubber (SBR) polymer binder;
polymer coated active material particles; and
a stabilized lithium metal powder.

2. A method of preparing a composition of matter comprising a styrene-butadiene rubber (SBR) polymer binder, polymer coated active material particles, and stabilized lithium metal powder comprising:
providing the polymer coated active material particles and the stabilized lithium metal powder;
mixing the polymer coated active material particles and stabilized lithium metal powder in a SBR polymer binder solution; and
evaporating the solution to form the composition of matter.

3. The method of claim 2, wherein the solution comprises an organic solvent.

4. The method of claim 3, wherein the organic solvent comprises toluene.

5. The composition of matter of claim 1 wherein the active material particles comprise one or more anode materials.

6. The composition of matter of claim 5 wherein the anode materials comprise at least one of graphite, silicon, or tin.

7. The composition of matter of claim 1 wherein the active material particles comprise one or more cathode materials.

8. The composition of matter of claim 7 wherein the cathode materials comprise at least one of $LiCoO_2$, $LiMnO_2$, $LiFePO_4$, $MnO_2$, or nickel manganese cobalt.

9. The composition of matter of claim 1 wherein the polymer coating comprises one or more of polyvinylidene difluoride or polyethyleneoxide.

10. The composition of matter of claim 1 wherein the polymer coating comprises polyvinylidene difluoride (PVDF) and the active material particles comprise graphite.

11. The composition of matter of claim 10 wherein the PVDF ranges from approximately 10-0.0001% by weight of the graphite.

12. The composition of matter of claim 10 wherein the PVDF ranges from approximately 0.75-3% by weight of the graphite.

13. The composition of matter of claim 10 wherein the PVDF is approximately 1% by weight of the graphite.

14. The method of claim 2 further comprising adding a conductive additive to the polymer coated active material particles, stabilized lithium metal powder and SBR polymer binder solution prior to evaporating the solution.

15. The method of claim 14 wherein the conductive additive comprises one or more of acetylene black or carbon fiber.

16. A composition of matter comprising:
a non-polyvinylidene difluoride (PVDF) binder comprising styrene-butadiene rubber (SBR) polymer; and
PVDF coated graphite particles, wherein the SBR polymer and PVDF are unmixed.

17. The composition of matter of claim 16, wherein the PVDF coated graphite particles do not operate as the binder.

18. The composition of matter of claim 16, further comprising stabilized lithium metal powder.

* * * * *